United States Patent [19]

Walz

[11] 3,946,039
[45]*Mar. 23, 1976

[54] RETICULATED FOAM STRUCTURE
[75] Inventor: Duane D. Walz, Milpitas, Calif.
[73] Assignee: Energy Research & Generation, Inc., Oakland, Calif.
[ * ] Notice: The portion of the term of this patent subsequent to Nov. 9, 1988, has been disclaimed.
[22] Filed: Aug. 11, 1971
[21] Appl. No.: 170,952

Related U.S. Application Data
[63] Continuation-in-part of Ser. No. 679,204, Oct. 30, 1967, Pat. No. 3,616,841.

[52] U.S. Cl. .................. 264/332; 75/222; 428/310; 427/243; 427/384; 164/34; 164/114; 164/113; 164/246; 264/44; 264/59
[51] Int. Cl. ............................................. C04b 35/60
[58] Field of Search .......... 264/44, 59, 332; 75/222; 164/34, 113, 114, 246; 117/98 F, 138.8 D, 168

[56] References Cited
UNITED STATES PATENTS

| | | | |
|---|---|---|---|
| 3,090,094 | 5/1963 | Schwartzwalder et al. | 75/222 |
| 3,097,930 | 7/1963 | Holland | 264/59 |
| 3,111,396 | 11/1963 | Ball | 264/63 |
| 3,171,820 | 3/1965 | Volz | 264/84 |
| 3,339,620 | 9/1967 | Krzyzanowski et al. | 164/34 |
| 3,353,994 | 11/1967 | Welsh | 117/98 F |
| 3,362,818 | 1/1968 | Schwarzkopf et al. | 264/59 |
| 3,408,180 | 10/1968 | Winkler | 264/44 |
| 3,497,256 | 2/1970 | Rosenblatt | 264/44 |
| 3,536,480 | 10/1970 | Winkler | 264/44 |
| 3,616,841 | 11/1971 | Walz | 264/44 |
| 3,639,507 | 2/1972 | Uram | 164/246 |
| 3,666,526 | 5/1972 | Ettinger et al. | 264/44 |

OTHER PUBLICATIONS

*Principles of Polymer Systems* by F. Rodriquez, McGraw–Hill, 1970, pp. 413–416 and 445–447.
"You Can Investment Cast the Most Minute Detail", Oct. 1965, Precision Metal Molding, p. 49.
R. G. Skerritt, "Remarkable Art Casting by a New Process", 2/26/16, *Scientific American*, at 225.

*Primary Examiner*—Melvyn I. Marquis
*Attorney, Agent, or Firm*—Townsend and Townsend

[57] ABSTRACT

Method and manufacture are provided for preparing a reticulated foam structure by: investing an organic reticulated foam structure with an inorganic composition, which composition is inert under the conditions for forming the reticulated structure; allowing the inorganic suspension to set to form an investment; removing the organic reticulated foam structure; filling the voids of the investment with a fluid composition to form a reticulated casting; and dissolving the investment so as to leave a reticulated foam structure casting.

12 Claims, No Drawings

RETICULATED FOAM STRUCTURE

RELATED APPLICATIONS

This application is a continuation-in-part of application Ser. No. 679,204, filed Oct. 30, 1967 now Pat. No. 3,616,841.

BACKGROUND OF THE INVENTION

1. Field of the Invention

Stable foam structures can have a wide variety of uses. They can act as supports for catalysts, providing for a high surface to volume ratio. Depending on the material employed, they can act as coalescing agents for oil-in-water emulsions or as filtering devices. Because of the high strength to weight ratios which are possible, foam structures can act in various constructions as lightweight building materials, such as in air frames or, where weight is of significant concern. In addition, the materials can act as supports for a variety of other materials with which they may or may not react. Also, the reticulated foam structures may find use as solid propellant reinforcement and burning rate modifiers, battery plates, electrochemical anodes and cathodes, heat shields, heat exchanger cores, sound or shock absorbers, anodic protectors, flame guards, liquid reservoirs, micro-wave reflectors, radiation shields, wicks, etc.

In many of the uses for reticulated structures, it is desirable or necessary that these structures be relatively free of closed cells. Furthermore, a relatively uniform structure is desirable, so that pore sizes do not differ to any significant extent. In addition, for commercial manufacture, the method should permit a relatively reproducible means for forming structures of substantially uniform dimensions and properties.

2. Description of the Prior Art

Numerous patents have been issued describing a variety of ways of making open pore cellular foam of materials such as metals, metal alloys, metal oxides, ceramics, glasses and the like. Included among these patents are U.S. Pat. Nos. 3,052,967, 3,090,094, 3,111,396, 3,362,818, 3,408,180 and 3,470,117. See U.S. Pat. No. 3,171,820 for preparation of reticulated polyurethane foam.

SUMMARY OF THE INVENTION

A reticulated foam structure of metals, ceramics, polymers or the like is prepared by investing an organic foam structure with an inorganic composition which sets to a hard rigid structure. The inorganic composition is inert under the conditions employed in preparing the reticulated foam structure, until the last step, when it is capable of dissolution, so as to leave the reticulated structure free of the investment material. After the investment has set, the organic foam material is removed and the voids filled with a metal, ceramic, or polymer composition or combination thereof or the like. After the composition has set, the inorganic investment material is then dissolved away. Reticulated foams may be prepared of various metals, such as aluminum, beryllium, magnesium, uranium, iron, etc.; alloys, such as aluminum-silicon, aluminum-magnesium, and aluminum-zinc; ceramics based on aluminum oxide, silicon dioxide, ferric oxide, including refractories, such as carbides and nitrides; organic polymers, such as polyimides, polyaromatic ethers and thioethers, fluorocarbons, etc.

DESCRIPTION OF THE SPECIFIC EMBODIMENTS

In carrying out the method of this invention, a reticulated foam structure is provided. These structures are commercially available or can be prepared, if desired. Optionally, the structure may be coated internally with a wide variety of materials.

The first essential step is the investment. Here, a fluid suspension of an inorganic composition is introduced into the reticulated foam structure and allowed to set to a rigid structure. In this way, a positive is formed of the original foam structure.

The second essential step is the removal of the original organic foam structure, so as to provide a pattern of voids or internal passageways in the investment, corresponding to the original foam structure.

The third essential step is the filling of the voids with the desired composition for the final reticulated foam structure.

Finally, the investment is dissolved in a convenient medium.

Each of the steps will be considered individually with the compositions and conditions employed. The first consideration is the foam structure or pattern. Any form retaining organic reticulated foam pattern may be employed. Various organic foams may be obtained from organic polymers. For example, foams may be derived from condensation polymers, such as polyurethanes, polyureas, polyesters, polyamides and polyethers. Alternatively, addition polymers may be employed, such as polystyrene, polyvinyl chloride, polyethylene, polypropylene, etc. Also, combinations of the two materials may be used. In addition, foamed wax may be employed. The wax may be foamed by emulsifying the wax, removing the emulsifier to form a stable structure, and then blowing hot air or a solvent through the wax so as to break the membrane walls to open the various cells to form a reticulated structure.

Of the various foams, polyurethane is commercially available, for example from Scott Paper, Co., under the names Polyfoam and Scott Industrial Foam. Polyurethane may be reticulated in a wide variety of ways. See a discussion of reticulated polyurethane foams in Chemical and Engineering News, June 7, 1965, Pages 44ff. The methods employed for reticulating polyurethane foam can be used in reticulating other types of foam.

A wide range of pore sizes is available and may be used in this invention, varying from 3 to 125 pores per linear inch (ppi). Usually the pore size will be from about 10 to 80 ppi. Commercially, pore sizes may be obtained in at least a range of 10 ppi to 100 ppi.

It is frequently desirable to employ a foam having a pore size somewhat larger than is desired for the final product. The pore size may then be reduced in a variety of ways with concommittant increases in ligament size.

Plastic foam can be obtained or produced in a variety of widths, thicknesses and shapes. The plastic foams are generally easily worked and can be modified to obtain various intricate forms, so as to avoid extensive working of the final product.

Various materials may be used for coating the foam. These materials include wax, epoxy resins, silicon rubber, polymers, e.g., polyurethane, etc. Any material may be employed which may be coated onto the polyurethane foam, conveniently by dipping, either in a solution or melt of the coating material. Depending on the thickness of the coat desired, it may be desirable to coat the foam one or more times by repeated dippings. With wax, to insure a uniform coating, and to eliminate "windows", i.e. a thin membrane extending between ligaments, the pattern prior to setting of the wax is agitated, squeezed, shaken or heated. Heating is usually at a temperature of from about 150° to 200°F., and, above the melting point of the wax employed. The excess wax is allowed to drain off. Also, it is frequently desirable to blow the wax coated foam with a warm air stream.

Alternatively, depending on the particular foam material, the foam structure may be swelled by using an appropriate non-solvent. For example, controlled swelling may be achieved with polyurethane by using a solvent such as trichloroethylene, which has a sufficiently high boiling point so as to be retained by the foam material.

In choosing a coating material or swelling agent, consideration should be given to the need to remove the material along with the organic foam from the investment.

One or more pieces of plastic foam may be employed so as to have a heterogeneously formed reticulated foam structure. That is, two different organic foam pieces may be joined, in a variety of shapes, so as to have areas of different pore size. As an illustration, one piece might be cut in the form of a cylinder and the other piece of an annulus surrounding the core. The finished foam structure produced with such a pattern will maintain its integral and continuous nature, but will possess different sized cells in the central portion, than in the radially outer portions. The method could be extended to include multiple pieces of plastic foam individually oriented. This process would then produce a material having an inhomogeneous structure. The anisotropy of the structure can be further increased by deforming the structure after cooling, so as to achieve highly dimensionalized and anisotropic properties.

Once the coating, if any, has set and is of the desired thickness to provide the desired ligament size, the organic foam is ready to be invested. A wide variety of materials may be used for the investment, subject to certain conditions. The investment composition must be capable of being introduced uniformly through the pores. Once introduced, it must set within a reasonable time to a rigid stable structure. When setting, the investment composition should not undergo undue expansion or contraction, which results in either injury to the reticulated organic foam or lack of uniformity and discontinuity in the investment structure. Once set, the investment composition must be structurally stable to removal of the organic reticulated foam material and to the material employed for forming the desired inorganic reticulated foam structure. Finally, in accordance with this invention, the investment material must be readily removable so as to leave the inorganic reticulated foam structure free of the investment material.

For the most part, the investment compositions will be aqueous suspensions or aqueous suspension-solutions of inorganic salts, at least one of the salts having an alkaline earth metal. The amount of the alkaline earth metal salt(s) including oxides and hydroxides will generally vary from 5 to 100 percent of the inorganic salts present. Normally, a mixture of more than one salt will be used, sometimes as many as five salts or more being employed. The group II metals which may be employed as their salts include beryllium, magnesium, calcium, strontium, and barium. Preferred cations are magnesium and calcium.

The other salts will normally be alkali metal salts (Group I). These salts include lithium, sodium, potassium, etc.

A wide variety of anions may be employed, including oxide, hydroxide, chloride, sulfate, phosphate, borate, aluminate, silicate, carbonate, etc. With the group II metals, the preferred anions are oxide, hydroxide and sulfate.

Various salts include magnesium oxide, magnesium sulfate, calcium sulfate, beryllium sulfate, beryllium oxide, magnesium carbonate, magnesium chloride, sodium chloride, potassium chloride, potassium phosphate, sodium phosphate, sodium aluminate, lithium silicate, lithium sulfate, barium sulfate, barium carbonate, sodium borate, potassium borate, calcium borate, etc.

As already indicated, the alkaline earth metal salts will generally be present in from 5 to 100 percent of the salt composition. Therefore, the other salts may be present in from 95 to 0 percent. Usually, the alkaline earth metal salts will be present in from about 15 to 100 percent, more usually 25 to 100 percent.

An aqueous medium is normally employed to provide a pourable suspension. However, other mediums of oxygenated organic solvents may be employed, such as alcohols, esters and polyesters. Enough liquid is used to give sufficient fluidity and reduce the viscosity of the suspension to allow the composition to flow smoothly into the organic reticulated foam structure. The amount of liquid employed will usually be at least about 8 weight percent and not more than about 100 weight percent, moroe usually at least about 10 weight percent and not more than about 50 weight percent of the inorganic salt composition. The amount of liquid employed will vary depending on the salts used in the inorganic composition. Therefore, the amount of liquid used will be adjusted with the different salt compositions to obtain a composition having the desired viscosity. With certain salts, with water as the medium, it is found desirable to have from 0 to 40 volume percent of a lower alkanol such as methanol or ethanol present. The lower alkanol normally reduces the time for drying, and aids in reducing the viscosity of the composition.

In the investment composition, various materials other than salts may be present in minor amounts, usually in from about 0.05 to 10 weight percent based on the entire composition. Emulsifiers may be employed, particularly non-ionic emulsifiers, such as the alkylpolyethyleneoxy alcohols or alkylphenylpolyethyleneoxy alcohols or esters. These will usually be present in from about 0.05 to 1 weight percent of the entire composition. Gum arabic may be employed in amounts varying from 1 to 10 weight percent of the entire composition. Also, inert fillers may be used such as walnut shell powder, dried blood, talc, silica flour, etc. These will normally be used in amounts of from about 0.5 to 10 weight percent of the entire composition.

The metal salts which are insoluble in water will normally be employed as extremely fine powders so as to provide a relatively creamy composition. The mesh size will usually vary in the range of −250 to −450 U.S. standard. Usually, the substantially insoluble salts will be mixed to form a relatively homogeneous dry mixture. This dry mixture may then be added to a solution of the soluble salts or to water and the mixture stirred till substantially homogeneous. The particular method of forming the investment mixture is one of convenience and is not essential to the nature of the invention.

An alternative to the fluid salt suspensions is the use of fine flowable powders, such as carbon powder and colloidal graphite, which may be bound together to form a stable structure with a resin, e.g., a phenolic, such as phenolformaldehyde. This type of mold is particularly useful with oxides, which will form stable carbides when heated in the presence of carbon at elevated temperatures.

In preparing the pattern for investment, a wax layer may be provided completely across one end or side of the reticulated organic foam. This layer or runner may be formed on the pattern by melting wax in a dish or pan, the height of the melting wax in the dish or pan being that of the desired wax runner on the pattern. The pattern is then set in the dish and the wax permitted to cool and solidify. The dish or pan is preferably formed of foil or the like, so as to permit stripping from the wax. The excess wax is then trimmed or cut away to conform to the shape of the pattern.

A pouring sprue or gate may be inserted into the wax runner, preferably immediately prior to the setting of the wax. The pouring sprue is preferably formed of wax, styroform, or other material which may be easily removed with the pattern.

The pattern is now ready for investment with the investment composition. A casting flask preferably having side walls and an open bottom and top is placed on a vibrating table. The pattern is disposed therein and spaced from the side walls, the bottom and the top, with the sprue uppermost. The investment is poured into the flask completely around the pattern. The bottom of the flask is sealed to the table and the table vibrated. A vacuum is preferably pulled on the flask by sealing the top of the flask with a cover and connecting a port on the cover to a vacuum source. The vacuum assists in removing air from all interstices of the pattern and insures the investment material flowing uniformly throughout the pattern. The vacuum and vibration, either individually or together, are continued for sufficient time to insure substantially uniform distribution of the investment material in the pattern. Usually, a few seconds or a few minutes will suffice.

The investment material is now allowed to set. Normally, depending on the exigencies of time, the investment may set by evaporation or chemical reaction at ambient temperatrues. If desired, a mild vacuum or relatively mild heating may be employed, usually not exceeding about 250°F. Preferably, the investment is allowed to dry at temperatures below about 150° F.

If desired, to insure substantially all the water being driven off, the invested organic foam may be introduced into an oven at a temperature of from 100° to 300° F., for a time from about 30 minutes to 6 hours. Preferably, if elevated temperatures are employed for driving off the water, wax will be employed in coating the original organic reticulated foam. The wax softens and melts, running off, leaving passageways for the escape of steam. These passageways permit high rates of steam venting and therefore high temperatures for short periods of time to achieve substantial dehydration. If foam wax or other low melting pattern is employed, then the investment will be allowed to set at ambient temperatures, certainly at temperatures below the softening point of the wax.

Once the investment has set to the desired rigidity, the flask is removed from the table and the lower layer of plaster scraped away, exposing the pores or voids on the surface of the pattern remote from the sprue. Then, the original organic reticulated foam pattern may be removed. With wax, the wax may be removed by heating the investment and pattern to a temperature above the melting point of the wax. If desired, any remaining traces of wax may be removed by washing the investment with an inert hydrocarbon solvent and allowing the solvent to evaporate.

With polymers, a preferred method is to heat the invested organic reticulated foam to a temperature which volatilizes the polymer either by decomposition or other means, so as to leave the investment free of the reticulated organic foam. Preferably, the temperature is raised slowly from an initial temperature in the range of ambient to 500° F. at about a rate of from 50° to 200° F. per hour, more usually from about 75° to 125° F. per hour until the desired temperature is reached. The desired temperature will be at least about 900°, more usually at least 1200° F., and usually not exceed about 1800°, more usually 1500°F. Usually, it will take at least about 0.5 hours and fewer than 6 hours, more usually from about 1 to 4 hours to remove substantially all of the organic material present. The rate of removal can be somewhat enhanced by introducing a stream of oxygen into the voids which initially form at the periphery of the investment. If desired, when it appears that all of the organic material is gone the investment may be flushed with oxygen, followed by a flushing with an inert gas, such an argon or nitrogen.

With condensation polymers, it is possible to remove the polymer by chemical action. By an appropriate choice of investment material, strong base or acid may be used to hydrolyze or decompose the polymeric material. Dipping the invested organic foam into the desired acid or base bath, normally at mildly elevated temperatures, will result in the slow removal of the organic foam to leave the desired void pattern. Therefore, depending on the particular organic foam employed, either thermal or chemical action may be used for the removal of the reticulated organic foam.

Where a flowable powder has been employed, such as carbon, the reticulated organic foam may be removed in the manner described above, with due consideration of the means for bonding the powder. With polyurethane as the reticulated foam, a caustic bath will usually suffice. A carbon mold will remain which can be used to form a reticulated foam.

As indicated, various materials may be used in forming the final inorganic reticulated structure. These materials include metals, metal alloys, ceramics, cermets, vitreous and polymers. With certain techniques, refractories, such as carbides and nitrides can be obtained. With the metals and metal alloys, normally, casting of the molten metal will be employed. Accordingly, the investment is placed on a chill plate and the molten metal poured through the sprue into the investment. Water is sprayed on the outer walls and on the chill plate to help in cooling. As the molten metal hits the chill plate, it solidifies along the bottom, and the water cooling tends to cause solidification along the sides inwardly. Cooling can be further controlled by applying heat to the sprue, in order to keep the metal in the sprue molten, until the remainder of the casting has solidified. Conveniently, electric resistance heating or torches may be employed. Alternatively, to the use of water, streams of cold air or other refrigeration means may be used.

To assist the flow of the molten metal through the investment, a pressure differential may be created through the investment. This may be achieved by applying air or other gas pressure to the upper surface. Conversely, the chill plate may be provided with apertures and connected to a vacuum source. In addition or alternatively, the investment may be vibrated or centrifuged to assist the proper flow of the metal through the investment.

Where a ceramic material is desired, the various inorganic salts for the ceramic may be dispersed in an aqueous medium to form a homogeneous flowable suspension which can be introduced into the investment, much the same way that the investment material was introduced into the original reticulated structure. The powders employed will normally be of a mesh size, such as to have 90% passage through a 5 $\mu$ screen.

The suspension is allowed to dry so as to form a substantially compact uniform composition throughout the investment. Alternatively, the ceramic composition may be dispersed with a polymeric composition, such as an alkyd resin or condensation polymer. The resins bind the particles together. The ceramic ingredient will normally be from about 40 to 70 weight percent of the composition. The ceramic structure is then formed by introducing the investment into an oven at a temperature at which the ceramic composition sinters so as to form a uniform mass. Upon cooling, a reticulated ceramic structure will be formed with the voids filled by the investment material. Metal powders may be sintered much in the same way as the ceramic material, to form a metal reticulated structure. The significant factor is that the composition may be treated in a manner so as to form a solid coherent structure, with ceramics, metals and the like, passing through a melt or sintering stage.

With ceramics, of course, an investment material must be employed which will not soften or melt at the temperature at which the ceramic material sinters. Therefore, a high melting investment material should be employed, such as magnesium oxide, or calcium sulfate. Furthermore, the investment material should not itself form a glass or ceramic, nor should it be dissolved by or become involved with the ceramic structure.

With organic polymers, the polymer may be a thermoplastic polymer or thermosetting. With thermoplastic polymers, the melt may be cast in the same manner as a metal, employing temperatures suitable to the polymer, usually in the range of about 120° to 600°C. With either type of polymer, the polymer may be prepared in situ. Addition polymers may be prepared by adding monomer and catalyst, if required. Condensation polymers may be prepared by heating in the presence or absence of catalyst. Methods of polymerization are known in the art and may be readily applied to preparation of organic reticulated foam. Foam may be prepared from polystyrene, polyacrylonitrile, polyacrylates, polymethacrylates, polyvinyl chloride, polyimide, polyfluoroolefins, polyesters, polyamides, polyethers, etc. Preferred organic polymers are refractory polymers, such as polyimides, e.g., polybenzimide; polyfluorocarbons, polyaromatics, etc.

The choice of investment material will be governed by the particular polymer and the method of formation. The investment material should not be too porous, so as to absorb the polymer or monomer, nor react with the polymer or monomer to give undesirable side reactions. Many of the inorganic salts are satisfactory and may be used with a wide variety of polymers.

If desired, the final product may have a foamed internal structure, by employing a foaming agent in the composition employed for forming the reticulated structure. This is particularly convenient with ceramic compositions, where compounds may be added which will expand on heating or release a gas. Illustrative materials include liquid blowing agents, chemical agents that decompose to a gas, such as carbon dioxide, ammonia or nitrogen, etc. The foamed reticulated structure is extremely light weight and provides a high surface area. The ceramic composition will normally employ a binder, such as an organic polymer. Other compositions which may be foamed include organic polymers.

Another modification of the subject invention is to join the reticulated foam pattern by means of a binding agent to an organic material of a desired structure. The resulting structure is then invested to provide an investment of the composite structure. The pattern may then be removed by any of the ways described to leave a pattern of voids corresponding to the composite structure.

This technique permits forming a structure that has an increasing density toward skin and a complete contact joint between foam and skin. The density variation is controlled by the amount of coating applied to the foam pattern and the contact joint area is controlled by the thickness of the coating applied to the formed object.

A modification of the subject invention is the formation of reticulated structures having hollow ligaments. These structures can be achieved by coating the reticulated foam pattern with a fluid composition which will adhere to the walls of the pattern and be capable of forming a coherent form retaining structure. Solutions, suspension or powders which are held together with a suitable binder may be employed.

Conveniently, with metals, metal alloys, ceramics and cermets, a composition can be prepared of fine powders, such as are employed with the ceramic compositions, and a polymeric organic binder, e.g. phenolformaldehyde, alkyd, etc. Alternatively, solutions of polymers may be used, where a volatile solvent is employed. When appropriate, suspensions or dispersions may be employed, such as ceramic compositions, particularly with colloidal binders.

The pattern may be coated in a variety of ways by dipping, pouring the composition through the pattern, or other convenient means. One or more coats may be applied, with draining permitted between each coating to enhance uniformity. When the desired thickness of the coating has been achieved, the coated pattern may be treated in a variety of ways, depending on the nature of the pattern and the nature of the coating. With metal powders, the pattern may be leached away and the metal sintered or sintering and burning away of the pattern carried out simultaneously. Ceramic structures can be prepared by sintering with simultaneous degradation of the polymer. Substantially the same procedures employed in preparing the reticulated structure may be employed in preparing the hollow structures.

The wall thicknesses will be at least about 0.1 mil and usually at least about 0.5 mil. The diameter of the passageways may be varied widely, being at least about 0.5 mil, more usually, at least about 1.0 mil and usually not exceed 50 mils. It should be understood, that the internal passageways of the hollow foam structure will be the same form as the original pattern.

If desired, the shell structure may be used in place of a solid investment, with either the hollow passageways or the normal passageways serving as the form. The hollow foam structure can be filled or the surfaces modified, either internally, externally or both.

Once the reticulated inorganic structure has been formed, the investment material may be removed in a variety of ways. Most conveniently, the investment material may be removed by washing with pressurized water. With dental investment material high pressure water jets are sufficient. Alternatively, the investment material may be removed by dissolution. Where magnesium oxide is used, by itself or in combination with other salts, concentrated nitric acid is effective in removing the investment material. Where silicates are used, hot caustic baths are effective. When sodium or calcium chloride is employed in combination with another salt, such as gypsum, warm water is usually sufficient to leach away the investment. This can be conveniently done by dipping the reticulated inorganic structure filled with the investment material into a bath having the desired composition and allowing the reticulated structure to remain immersed in the bath until all of the investment material is removed.

Where a carbon mold is employed, oxides such as silica or boric oxide may be poured as melts into the carbon mold. By heating the mold to a temperature of from about 2600° to 3600°C. for 36 hours, the oxide will be converted to the carbide. After the carbide has been formed, the mold may be cooled to 1000°C., transferred to a controlled oxidizing furnace and the carbon mold oxidized to leave a free-standing carbide structure.

Depending on the reticulated structure, the chemical nature of the structure may be modified. By employing a chemical heat treatment or chemical vapor deposition, using either a gas or a fluidized bed, refractory nitrides, carbides and oxides may be prepared, such as silicon nitride, boron nitride, silicon carbide, boron carbide, aluminum oxide, etc.

Also, the foam structure may be chemically or electrically etched, so as to change the ligament size. One could therefore prepare a reticulated foam structure having ligaments of a large diameter, which would be readily reduced as required.

Once formed, the reticulated inorganic structure may then be trimmed, shaped or otherwise treated to provide the final form of the product. Various modifications, both chemical and physical, can be carried out with the reticulated foam.

The nature of the structure, the method of manufacture and the diversity of materials, makes the reticulated foams extremely versatile. The foamed material may be coated with inorganic or organic compositions to provide surfaces having specified characteristics. For example, the surfaces may be coated with a catalytic material, so as to provide a high surface area and a turbulent fluid flow to ensure contact between the reactants and the catalytic surface. Alternatively, organic resins may be coated onto the surfaces, which could act as ion exchange resins, acid or basic catalysts, etc.

In addition, reticulated foams may be prepared of metals which may then be reacted at the surface with various reagents to provide chemically reactive or catalytic surfaces. For example, aluminum could be oxidized or chlorinated to provide a dehydrating or alkylating catalyst. Iron could be chlorinated to provide an alkylating catalyst. Group VIII metals, such as platinum, palladium, rhodium, iridium, etc. may be coated onto a ceramic surface, oxidized or chlorinated and then reduced to form a highly active catalytic surface.

The reticulated foam can act as a structure to enclose various materials. The foam could be filled with chemical reactants e.g. rocket fuels, which would provide an exothermic reaction when ignited. Alternatively, the foam could be filled with a strength enhancing material for structural use. The reticulated foam could be filled or coated with materials for energy or radiation attenuation or absorption e.g. sound, microwaves, x-rays, etc. Microballoons, made of ceramic, glass or the like, could be introduced, and held in place with a suitable binder.

Also, either in preparing the foam or subsequently, the reticulated foam can be bonded to various structural forms, such as films, plate, rods, etc. During casting, for example, at the bottom or other portion of the investment can be a plate or film of a material which will bond to the casting during cooling, so as to have the plate as an integral member. In this way, an integral skin is provided for the reticulated foam structure. Other forms can be bonded, welded or otherwise joined to the recitulated foam as required.

In accordance with the nature of the material, the reticulated foam may be heat treated e.g. annealing, cooled, or modified by other means to change the crystal structure, magnetic properties, electrical conducting properties, etc.

The following examples are offered by way of illustration and not by way of limitation.

A large number of compositions were invested in beakers and found to have satisfactory properties for investment. The following table is illustrative of a few of the compositions which were prepared and indicates the wide variety of different salts which may be employed. All values are reported in grams.

| Ex. I | MgO | 660 |
| --- | --- | --- |
| | MgSO$_4$ | 60 |
| | H$_2$O | 400 |
| | Tween 40 | 3 |
| | Gum Arabic | 48 |
| Ex. II | MgO | 1000 |
| | Li(SiO$_2$) | 125 |
| | H$_2$O | 216 |
| | Tween 40 | 5 |
| Ex. III | MgO | 660 |
| | MgCO$_3$ | 600 |
| | MgSO$_4$ | 60 |
| | MgCl$_2$ | 60 |
| | H$_2$O | 360 |
| Ex. IV | MgO | 660 |
| | MgCO$_3$ | 600 |
| | MgSO$_4$ | 60 |
| | H$_2$O | 360 |
| Ex. V | MgO | 900 |
| | MgCl$_2$ | 45 |
| | H$_2$O | 150 |
| Ex. VI | CaSO$_4$ | 48 |
| | NaCl | 240 |
| | H$_2$O | 52 |
| Ex. VII | CaSO$_4$ | 400 |
| | NaCl | 800 |
| | H$_2$O | 300 |
| Ex. VIII | CaSO$_4$ | 180 |
| | Na$_2$SO$_4$ | 360 |
| | H$_2$O | 135 |
| Ex. IX | CaSO$_4$ | 180 |
| | NaBO$_2$ | 360 |
| | H$_2$O | 135 |
| Ex. X | CaSO$_4$ | 180 |

| | | |
|---|---|---|
| | -continued | |
| Ex. XI | $K_3PO_4$ | 360 |
| | $H_2O$ | 135 |
| | $CaSO_4$ | 180 |
| | $Na(AlO_2)$ | 360 |
| | $H_2O$ | 290 |
| Ex. XII | $MgSO_4$ | 25 |
| | MgO | 0.5 |
| | $MgCO_3$ | 50 |
| | $H_2O$ | 12.5 |
| | $C_2H_5OH$ | 2.5 |

(Waters of hydration are intended, as appropriate. MgO is a mixture of calcined MgO and a small amount of slack MgO except in Example XII. $CaSO_4$ is gypsum hemihydrate. $MgSO_4$ is epsom salt).

In addition, several graphite investment materials were successfully tested, including graphite powder with colloidal graphite and phenol-formaldehyde as binder. The polyurethane foam was removed by soaking the cured investment in caustic solution prior to heating in an inert atmosphere for casting titanium.

EXAMPLE XIII

Commercially available polyurethane foam (supplied by Scott Paper Co.), which is used as a pattern, is coated with polyurethane solution by repeated dippings to obtain the desired ligament size. (The polyurethane solution is prepared by mixing 58.5 parts polypropylene glycol, 27.2 parts castor oil, 14.1 parts toluene diisocyanate (1:1 mole ratio of glycol to diisocyanate) and 0.2 parts of catalyst). After allowing the pattern to drain, the pattern is squeezed and centrifuged. Surplus coating is removed with absorbent towels and air blasts. The wet pattern is placed in a dryer and the coating cures at about 150°F. for about 30 minutes.

The dipping process was repeated employing a wax solution comprising equal parts of investment wax and Stoddard solvent, at a temperature of about 120°F. followed by drying at about 150°F. for about 30 minutes.

An investment composition is prepared using 67 parts of Grays Dental investment (calcium sulfate, talc and silica flour) or Ransome & Randolph's Ultra-vest and 33 parts of water. The pattern is placed in a flask open at top and bottom, the flask sealed to a vibrating table and covered. The cover has an outlet which is connected to a vacuum (29 inches Hg) and a second outlet connected to the investment composition. The investment composition is drawn into the flask while the flask is vibrated. When the flask is full, the hoses are disconnected and the investment is scraped to expose the foam. After the plaster has set, the flask is removed from the vibrating table and the bottom scraped to expose the foam. The investment is allowed to age, usually for about 12 hours at ambient conditions.

The flask is then placed in a kiln at 250°F. which is held for 4 hours; the temperature is increased to 350°F. and held for 20 hours and then the temperature is raised at a rate of 100°F./hours to 1200°F., which is maintained for about 24 hours.

Aluminum or other metal is melted and heated to about 200°F. about its melting point. The flask is removed from the kiln, placed on a chill plate and sealed to the chill plate using zinc chromate. The metal is poured into the sprue of the flask while applying a vacuum to the chill plate. The flask is insulated with insulation material and the sprue heated to 1300°F. initially. When the pattern is filled, the vacuum is removed, the casting allowed to cool and the sprue allowed to cool to 200°F. The flask is removed from the chill plate and the casting removed from the flask. The excess investment material is removed, followed by removal of the sprue and chill plate runner. The investment material is then removed from the casting with high pressure water nozzles.

EXAMPLE XIV

The pattern is prepared and invested as described above. The pattern is removed by soaking in aqueous 10% NaOH at 120°F. for about 4–8 hours. The investment is removed from the caustic bath and flushed with water.

An alumina composition is prepared by combining 3 parts alumina (Dispel, supplied by Conoco, Tulsa, Okl.), 54 parts alumina powder, 3 parts colloidal alumina (Baymal, supplied by Dupont Co., Wilmington, Del.), 1 part glycerine, 1 part methanol and 38 parts water.

The investment mold is sealed onto a vacuum plate and the sides sealed with plastic sheet and wax. After sealing the cover to the investment, the two outlets are connected to a vacuum line (29 inches Hg) and the slurry container respectively. The investment is vibrated as the slurry is drawn into the investment. When the mold is full the hoses are disconnected and the cover removed.

The mold is then heated at 120°F. at 50% relative humidity for about 24 hours. After removing the plastic from the mold, the temperature is then raised 10°F./hour over a period of 24 hours while maintaining the humidity, followed by raising the temperature 100°F./hour for 20 hours, holding for 4 hours at about 2400°F. and then cooling down at a rate of 50°F./hour to room temperature.

The mold is then held in hydrochloric acid at about 100°F. for about 12 hours. The alumina foam is removed from the acid bath and washed with water.

The procedure can be repated using an aluminate or polymeric binder e.g. styrene modified alkyd resin, in place of colloidal alumina.

EXAMPLE XV

Following the above procedure, 660 g. of magnesium oxide was mixed with 600 g. of magnesium carbonate. A solution was prepared of 360 g. of water, 60 g. of magnesium chloride and 60 g. magnesium sulfate haptahydrate. The dry mixture of magnesium oxide and magnesium carbonate was combined with the solution to form a homogeneous dispersion. Polyurethane supplied by Scott Paper Co. having 10 ppi was coated with wax by dipping the polyurethane into the wax, so as to enhance the ligament size. After the wax had been drained and any windows blown open with warm air, the polyurethane was then filled with the investment composition. After standing 2 days, the investment had sufficiently solidified so as to provide a rigid structure. The investment containing the polyurethane foam was then introduced into an oven, and the temperature was increased at the rate of 100°F/hour until 2400°F. was achieved. This temperature was maintained for 8 hours, then was decreased at the rate of 100°F./hour until 1200°F. was achieved.

Following the normal procedures for casting, an aluminum reticulated structure was then cast in the substantial likeness of the wax coated polyurethane structure.

EXAMPLE XVI

The procedure of Example XIII is employed in preparing the pattern. A sheet or tube of a plastic, such as polyurethane or polyvinylchloride is formed in the desired shape. The formed plastic object is coated with a polyurethane solution, such as that described in Example XII by any convenient means, such as dipping, rolling, spraying or brushing. The reticulated pattern and formed object are brought together to form an assembly and a slight compressive load is applied to the interface assembly.

The assembly is cured at about 150°F., while maintaining compressive loading of the interface until the joint is cured. The procedure of Example XIII may then be followed in preparing the composite. Due to surface tension and wicking action of the foam pattern a smooth transition joint is made.

EXAMPLE XVII

The procedure of Exmaple XIV is followed except the mold was blown with warm air to enhance drying prior to introducing the following ceramic composition:

|  | Parts by wt. |
| --- | --- |
| Polyester* | 22 |
| Dispel | 2 |
| Cellulose acetate butyrate | 0.4 |
| Styrene | 10 |
| Alumina powder | 55 |
| Perchloroethylene | 10 |
| MEK peroxide | 0.2 |
| Cobalt Octoate | 0.2 |
| Tween 40 | 0.2 |
| Maleic anhydride | 1.2 |
| Sodium carbonate | 1 |
| Water | 1.8 |

*(The polyester is prepared from 9.4 moles of triethylene glycol, 6.0 moles of maleic anhydride and 4.0 moles of isophthalic acid thinned with 15% styrene). The sodium bicarbonate is added to the polyester mixture with the alumina and the sodium bicarbonate and water with the cobalt octoate.

Immediately after casting the ceramic slurry in the mold, the mold is pressurized in a bell jar, the pressure in the jar controlling the foam cell size.

EXAMPLE XVIII

A polyurethane foam pattern (see Example XIII) is washed in warm water/green soap solution, rinsed in cold water and dried, followed by an ethanol rinse and drying. The foam is then immersed in a 1 wt. percent isopropanolic fumed alumina solution and dried, followed by immersion in a ceramic slurry, such as

|  | Parts by weight |  |
| --- | --- | --- |
| Alumina powder | 55 |  |
| Guanidine aluminate | 5 | (Al₂O₃ by weight) |
| Isopropanol | 1 |  |
| Glycerine | 1 |  |
| Water | 38 |  | slowly removed and drained. After centrifuging to remove excess slurry, the coated foam is heated at 80°F. and 50% relative humidity for 1–2 hours. The coating procedure is repeated until the desired thickness is obtained.

The coated foam is heated to 120°F. and 50% relative humidity and the temperature raised 10°F./hr. for 24 hours. The temperature is then raised 100°F./hr. in a kiln for 20 hours from an initial temperature of 350°F., held for 4 hours at approximately 2400°F. and then cooled to room temperature at a rate of 50°F./hr.

If desired, the hollow ceramic structure prior to firing could have been invested with a suitable material so as to have a reticulated foam structure with a ceramic outer layer.

The above procedures can be carried out with minor modifications in casting a wide variety of metals and metal alloys such as aluminum, beryllium, aluminum-silicon, aluminum-magnesium, aluminum-zinc, copper, nickel, iron, silver, uranium, zinc, lead, etc. Various ceramic mixtures may be formed, employing inorganic materials, such as petalite talc, albite, orthoclase, anorthite, titania, barium ferrite, steatite, etc. Various polymer mixtures may be formed, employing organic materials, such as polyimides, fluoro carbons, etc., either preformed or polymerized in situ.

By virtue of the subject invention, a wide range of pore sizes can be formed ranging from as much as 3 to 125 ppi. Since sintering is not required, materials which are highly oxidizable, such as aluminum and beryllium may be employed. Furthermore, a substantially homogeneous reticulated structure is achieved. The method employed provides extreme flexibility in using various combinations of reticulated foams, varying pore sizes, varying materials, and carrying out operations in a simple and expedient manner with substantially conventional equipment. The finished foam material is characterized in having ligaments which are continuous, gas free or of low porosity and of integral construction. Since the cell size and shape of the pattern is multidirectional uniform, so will be the cell size and shape of the produced foam material. Conveniently, the cells can be formed as a regular polyhedra, particularly a dodecahedron.

What is claimed is:

1. A method for manufacturing a reticulated foam structure which comprises:

investing a reticulated organic foam pattern uniformly with an inorganic investment composition containing an alkaline earth salt, oxide or hydroxide, or carbon and a resin from which the air is removed, which is settable to a structurally stable positive of said pattern;

allowing said inorganic investment composition to set to a form retaining investment;

removing said pattern from said investment, by thermal or chemical means, so as to leave a pattern of internal passageways in said investment corresponding to said organic foam pattern;

introducing a forming composition capable of forming cohesive solid structure into said pattern of internal passageways while maintaining a pressure differential across said investment and vibrating said investment, so as to form a solidus reticulated foam structure, wherein when said forming composition is a molten composition, said forming composition is maintained in a molten state to flow through said investment, and when said forming composition is a sinterable material, said investment is heated to at least the sintering temperature to form said solidus reticulated foam structure; and removing said investment composition to leave a solidus reticulated foam structure of the solidified forming composition.

2. A method according to claim 1, wherein said reticulated foam structure has ligaments which are substantially the junctions of intersecting polyhedra.

3. A method according to claim 1, wherein said reticulated organic foam pattern is coated with at least one organic coating to form a pattern having ligaments of enhanced size.

4. A method according to claim 3, wherein said organic coating is wax.

5. A method according to claim 1, wherein said reticulated organic foam pattern has pore sizes of from 3 to 125 pores per inch.

6. A method according to claim 1, wherein said reticulated organic foam pattern is a polyurethane.

7. A method according to claim 1, wherein said reticulated organic foam pattern is wax.

8. A method according to claim 1, wherein said inorganic investment composition comprises at least one alkaline earth metal salt, oxide or hydroxide.

9. A method according to claim 1, wherein said inorganic investment composition comprises carbon.

10. A method according to claim 1 wherein said pattern is removed by heating at a temperature sufficient to melt or degrade said pattern.

11. A method according to claim 1, wherein said pattern is removed by hydrolysis with acid or basic catalysis.

12. A method according to claim 1, wherein said forming composition is a melt of metal, glass, ceramic or combination thereof and said conditions are cooling to form a reticulated foam structure of metal, glass, ceramic or combination thereof.

* * * * *